(12) United States Patent
Yoo et al.

(10) Patent No.: US 8,615,702 B2
(45) Date of Patent: Dec. 24, 2013

(54) METHOD AND APPARATUS FOR CORRECTING ERRORS IN MEMORY DEVICE

(75) Inventors: Sung Joo Yoo, Pohang-si (KR); Nam-Wook Kang, Cheongju-si (KR); Chan Ik Park, Hwaseong-si (KR); Hyun Jin Choi, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 129 days.

(21) Appl. No.: 13/236,701

(22) Filed: Sep. 20, 2011

(65) Prior Publication Data

US 2012/0151294 A1   Jun. 14, 2012

(30) Foreign Application Priority Data

Dec. 9, 2010   (KR) .......................... 10-2010-0125710

(51) Int. Cl.
*H03M 13/00* (2006.01)

(52) U.S. Cl.
USPC ........................................................ 714/780

(58) Field of Classification Search
USPC ........................................................ 714/780
See application file for complete search history.

(56) References Cited

U.S. PATENT DOCUMENTS

| 6,401,228 | B1 * | 6/2002 | Ichikawa et al. ............... 714/755 |
| 7,937,647 | B2 * | 5/2011 | Bellipaddy et al. ........... 714/774 |
| 2004/0083333 | A1 | 4/2004 | Chang et al. | |
| 2011/0219266 | A1 * | 9/2011 | Rao et al. ........................ 714/35 |

FOREIGN PATENT DOCUMENTS

| KR | 1020090048142 A | 5/2009 |
| KR | 1020090093695 A | 9/2009 |
| KR | 1020090122060 A | 11/2009 |

* cited by examiner

*Primary Examiner* — M. Mujtaba K Chaudry
*Assistant Examiner* — Enam Ahmed
(74) *Attorney, Agent, or Firm* — Volentine & Whitt, PLLC (57) ABSTRACT

A memory controller analyzes read data received from a memory device and first error correction code (ECC) data of the read data. A control unit generates a plurality of sub-data from write data to be written in the memory device where the number of error bits in the read data is greater than a number of error bits that can be corrected using the first ECC data. An ECC block generates the first ECC data and second ECC data by using substantially the same algorithm to correct errors in each of the sub-data. The control unit transmits each of the sub-data, the first ECC data and the second ECC data to the memory device.

20 Claims, 10 Drawing Sheets

| Program/Erase cycle | 30-1 |
|---|---|
| Block 0 | 82 |
| Block 1 | 10 |
| Block 2 | 71 |
| Block 3 | 87 |
| ⋮ | ⋮ |
| Block N-2 | 3 |
| Block N-1 | 66 |
| Block N | 9 |

| Program/Read count | 30-2 |
|---|---|
| Block 0 | 800 |
| Block 1 | 100 |
| Block 2 | 700 |
| Block 3 | 600 |
| ⋮ | ⋮ |
| Block N-2 | 30 |
| Block N-1 | 700 |
| Block N | 90 |

| ECC error count | 30-3 |
|---|---|
| Block 0 | 8 |
| Block 1 | 1 |
| Block 2 | 7 |
| Block 3 | 8 |
| ⋮ | ⋮ |
| Block N-2 | 0 |
| Block N-1 | 6 |
| Block N | 1 |

| Program/Erase Fail count | 30-4 |
|---|---|
| Block 0 | 1 |
| Block 1 | 0 |
| Block 2 | 0 |
| Block 3 | 1 |
| ⋮ | ⋮ |
| Block N-2 | 0 |
| Block N-1 | 0 |
| Block N | 0 | status table

METHOD AND APPARATUS FOR CORRECTING ERRORS IN MEMORY DEVICE

CROSS-REFERENCE TO RELATED APPLICATIONS

This application claims priority under 35 U.S.C. §119 to Korean Patent Application No. 10-2010-0125710 filed on Dec. 9, 2010, the disclosure of which is hereby incorporated by reference in its entirety.

BACKGROUND OF THE INVENTION

Embodiments of the inventive concept relate generally to error correction technology. More particularly, embodiments of the inventive concept relate to a memory controller that controls a memory device to generate error correction code (ECC) data and uses the ECC data to correct errors in read data.

Semiconductor memory devices can be roughly divided into two categories according to whether they retain stored data when disconnected from power. These categories include volatile memory devices, which lose stored data when disconnected from power, and nonvolatile memory devices, which retain stored data when disconnected from power. Examples of volatile memory devices include dynamic random access memory (DRAM) and static random access memory (SRAM). Examples of nonvolatile memory devices include flash memory, electrically erasable programmable read-only memory (EEPROM), and a resistive random access memory (RRAM).

Flash memory is an especially popular form of nonvolatile memory due to various attractive features such as relatively high storage capacity, low power consumption, and resistance to mechanical shock. However, as the storage capacity of flash memory increases, it becomes more difficult to maintain reliable performance. Consequently, researchers continue to develop error correction strategies to address reliability issues in newer flash memory devices.

SUMMARY OF THE INVENTION

According to one embodiment of the inventive concept, a memory controller comprises a control unit that analyzes read data received from a memory device and first ECC data of the read data, and generates a plurality of sub-data from write data to be written in the memory device where the number of error bits in the read data is greater than the number of error bits that can be corrected by using the first ECC data. The memory controller further comprises an ECC block that generates the first ECC data and second ECC data by using substantially the same algorithm to correct errors in different units of the sub-data. The control unit transmits each of the plurality of sub-data, the first ECC data and the second ECC data to the memory device.

According to another embodiment of the inventive concept, a memory controller comprises a control unit that receives bad block information for a plurality of memory cells included in a memory device and generates multiple units of sub-data from write data to be written in the memory device where the received bad block information indicates a bad block. The memory controller further comprises an ECC block that generates first ECC data and second ECC data by using substantially the same algorithm to correct errors in each unit of sub-data. The control unit transmits each of the units of sub-data, the first ECC data and the second ECC data to the memory device.

According to another embodiment of the inventive concept, an error correction method comprises receiving information indicating a number of errors in data stored in a memory device, determining whether the number of errors is greater than a number of errors that can be corrected using a first ECC, and upon determining that the number of errors in the data is greater than the number of errors that can be corrected by the first ECC, generating multiple units of sub-data from write data to be written in the memory device, and generating the first ECC and a second ECC by using substantially the same algorithm to correct errors in different units of the sub-data, and transmitting the sub-data, the first ECC data and the second ECC data to the memory device.

These and other embodiments can improve the reliability of read operations performed by a memory device such as a flash memory device.

BRIEF DESCRIPTION OF THE DRAWINGS

The drawings illustrate selected embodiments of the inventive concept. In the drawings, like reference numbers indicate like features.

DETAILED DESCRIPTION

Selected embodiments of the inventive concept are described below with reference to the corresponding drawings. These embodiments are presented as teaching examples and should not be construed to limit the scope of the inventive concept.

In the description that follows, where a feature is referred to as being "connected" or "coupled" to another feature, it can be directly connected or coupled to the other feature or intervening features may be present. In contrast, where a feature is referred to as being "directly connected" or "directly coupled" to another feature, there are no intervening features present. As used herein, the term "and/or" encompasses any and all combinations of one or more of the associated listed items and may be abbreviated as "/".

The terms first, second, etc., are used herein to describe various features, but the described features should not be limited by these terms. Rather, these terms are used merely to distinguish between different features. For example, a first signal could be termed a second signal, and, similarly, a second signal could be termed a first signal without departing from the disclosed teachings.

The terminology used herein is for the purpose of describing particular embodiments only and is not intended to be limiting. As used herein, the singular forms "a", "an" and "the" are intended to encompass plural forms as well, unless the context clearly indicates otherwise. Terms such as "comprises" and/or "comprising," or "includes" and/or "including" specify the presence of stated features, but do not preclude the presence or addition of one or more other features.

Unless otherwise defined, all terms (including technical and scientific terms) used herein have the same meaning as commonly understood by one of ordinary skill in the art. Terms such as those defined in commonly used dictionaries should be interpreted as having a meaning that is consistent with their meaning in the context of the relevant art and/or the relevant description, and should not be interpreted in an idealized or overly formal sense unless expressly so defined herein.

Figure 1:
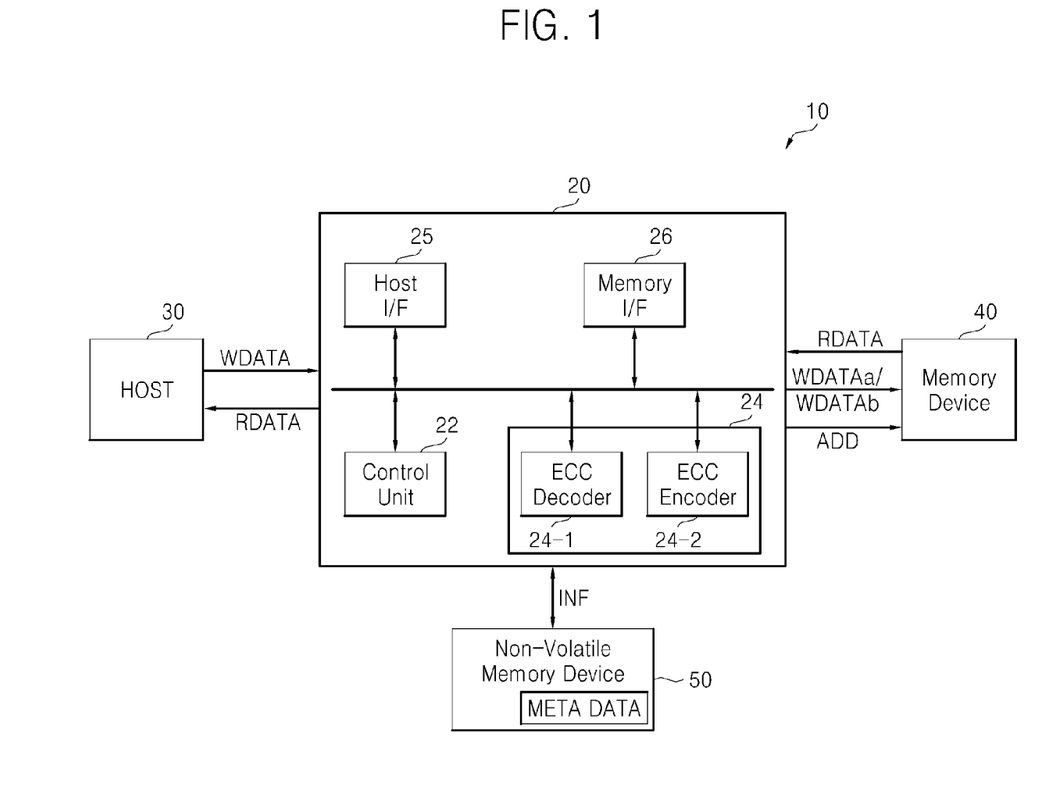
FIG. 1 is a block diagram of a memory system according to an embodiment of the inventive concept.
Figure 2:
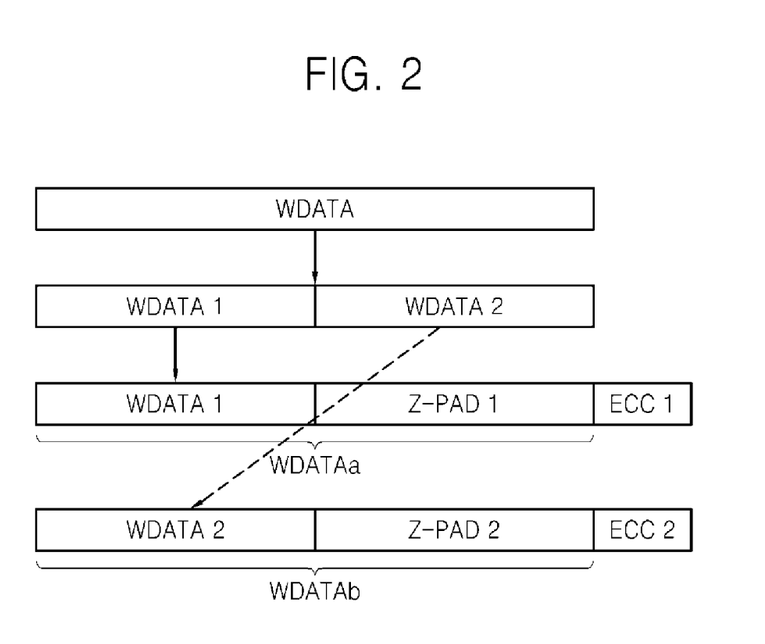
FIG. 2 is a conceptual diagram illustrating operations of a memory controller illustrated in FIG. 1 according to an embodiment of the inventive concept.

FIG. 1 is a block diagram of a memory system 10 according to an embodiment of the inventive concept, and FIG. 2 is a conceptual diagram illustrating operations of a memory controller shown in FIG. 1.

Referring to FIGS. 1 and 2, memory system 10 comprises a memory controller 20 and a memory device 40. Memory controller 20 comprises a host interface 25, a memory interface 26, a control unit 22, and an ECC block 24. Memory controller 20 controls the overall operation of memory device 40 in response to a request from a host 30.

Host interface 25 communicates with host 30 to transmit and receive data. Host interface 25 typically comprises a standardized interface such as a peripheral component interconnect (PCI) interface or a universal serial bus (USB) interface. Memory interface 26 communicates with memory device 40 to transmit and receive data. The data can include, for instance, a command, an address, data, or a control signal. Interfaces 25 and 26 can be implemented in a variety of ways, such as by hardware, or software for driving the hardware.

Control unit 22 controls the operation of ECC block 24. Control unit 22 receives read data RDATA output from memory device 40 via memory interface 26, and it receives first ECC data ECC1 from ECC block 24. First ECC data ECC1 is an error correction code for read data RDATA.

Control unit 22 analyzes the received read data RDATA and first ECC data ECC1, determines whether the number of error bits in the read data is greater than the number of error bits that can be corrected by using first ECC data ECC1. Upon determining that the number of error bits in the read data is greater than the number of error bits that can be corrected by using first ECC data ECC1, control unit 22 determines that a read failure has occurred.

Memory controller 20 receives write data WDATA, and control unit 22 generates sub-data WDATAa and WDATAb from write data WDATA. Here, each of sub-data WDATAa and WDATAb has the same number of bits as write data WDATA before division. Each of sub-data WDATAa and WDATAb is appended to ECC data ECC1 or ECC2.

Referring to FIG. 2, control unit 22 divides write data WDATA of 1024 bytes into data WDATA1 and WDATA2 of 512 bytes and generates sub-data WDATAa or WDATAb by padding data WDATA1 and WDATA2 with zeros (Z-PAD1 and Z-PAD2). The padding can be, for example, 512 bytes for each of data WDATA1 and WDATA2. Accordingly, the number of bytes of each of sub-data WDATAa and WDATAb is equal to the number of bytes of write data WDATA.

Control unit 22 controls ECC block 24 so that first ECC data ECC1 and second ECC data ECC2 is generated by using the same algorithm to correct an error of each divided sub-data WDATAa or WDATAb. Control unit 22 transmits each of divided sub-data WDATAa and WDATAb, first ECC data ECC1, and second ECC data ECC2 to memory device 40 through memory interface 26. That is, control unit 22 transmits data including sub-data WDATAa, first ECC data ECC1, data including sub-data WDATAb and second ECC data ECC2 to memory device 40.

Control unit 22 can output addresses ADD such that first ECC data ECC1 and second ECC data ECC2 are stored in the same memory block or different memory blocks of memory device 40. In addition, control unit 22 can output addresses ADD such that first ECC data ECC1 and second ECC data ECC2 are stored in the same page or different pages.

In some embodiments, memory controller 20 receives bad clock information INF for a plurality of memory cells included in memory device 40 and monitors whether the received bad block information INF indicates a bad block or good block.

Where bad block information INF indicates a bad block, control unit 22 divides write data WDATA into sub-data WDATAa and WDATAb after write data WDATA from host 30 is input to memory controller 20 through host interface 25.

Control unit 22 controls ECC block 24 to generate first ECC data ECC1 and second ECC data ECC2 by using the same algorithm to correct each error of divided sub-data WDATAa and WDATAb and transmits each of the divided sub-data WDATAa and WDATAb, first ECC data ECC1 and second ECC data ECC2 to memory device 40 through memory interface 26.

Figure 3:
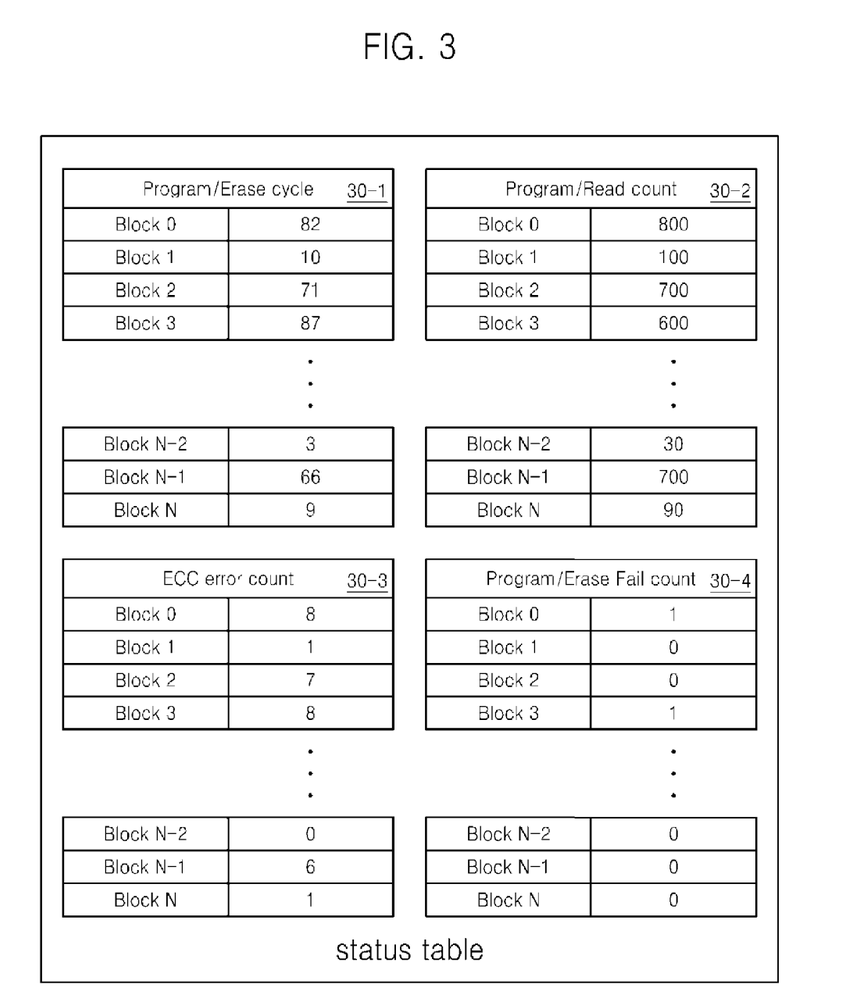
FIG. 3 is a status table displaying bad block information of a memory device illustrated in FIG. 1 according to an embodiment of the inventive concept.

FIG. 3 is a status table displaying bad block information of memory device 40 of FIG. 1. As illustrated in FIG. 3, bad block information INF includes a number of program/erase cycles 30-1, a program/read count 30-2, an ECC error count 30-3, and a program/erase failure count 30-4 of memory device 40. For example, a block 0 is shown with bad block information 30-1 through 30-4 having values 82, 800, 8 and 1, respectively.

In some embodiments, bad block information INF is stored in a region where metadata is stored. The metadata typically includes state information on an available block, a page and a memory cell of the memory device. The metadata can be stored in memory device 40 or a nonvolatile memory device 50 separate from memory device 40. Nonvolatile memory device 50 can be, for example, a NAND flash memory device. Bad block information INF is typically updated periodically to reflect a current state.

ECC block 24 comprises an ECC decoder 24-1 and an ECC encoder 24-2. ECC decoder 24-1 detects an error in read data RDATA output from memory device 40 and corrects the error using first ECC data ECC1. For example, where read data RDATA and first ECC data ECC1 are received from memory device 40 according to a request from host 30, and an error is detected in the received read data RDATA, ECC block 24 corrects the error using first ECC data ECC1.

In addition, where each of sub-data WDATAa and WDATAb, and each of ECC data ECC1 and ECC2 are received from memory device 40 and an error is detected in each received sub-data WDATAa and WDATAb, ECC block 24 corrects errors in sub-data WDATAa and WDATAb using ECC data ECC1 and ECC2, respectively. Error-corrected read data RDATA or error-corrected divided sub-data WDATA1 and WDATA2 is transmitted to host 30 through host interface 25.

ECC encoder 24-2 generates first ECC data ECC1 under the control of control unit 22 and generates second ECC data ECC2 having the same number of bits as first ECC data ECC1 with first ECC data ECC1 using the same algorithm.

Figure 4:
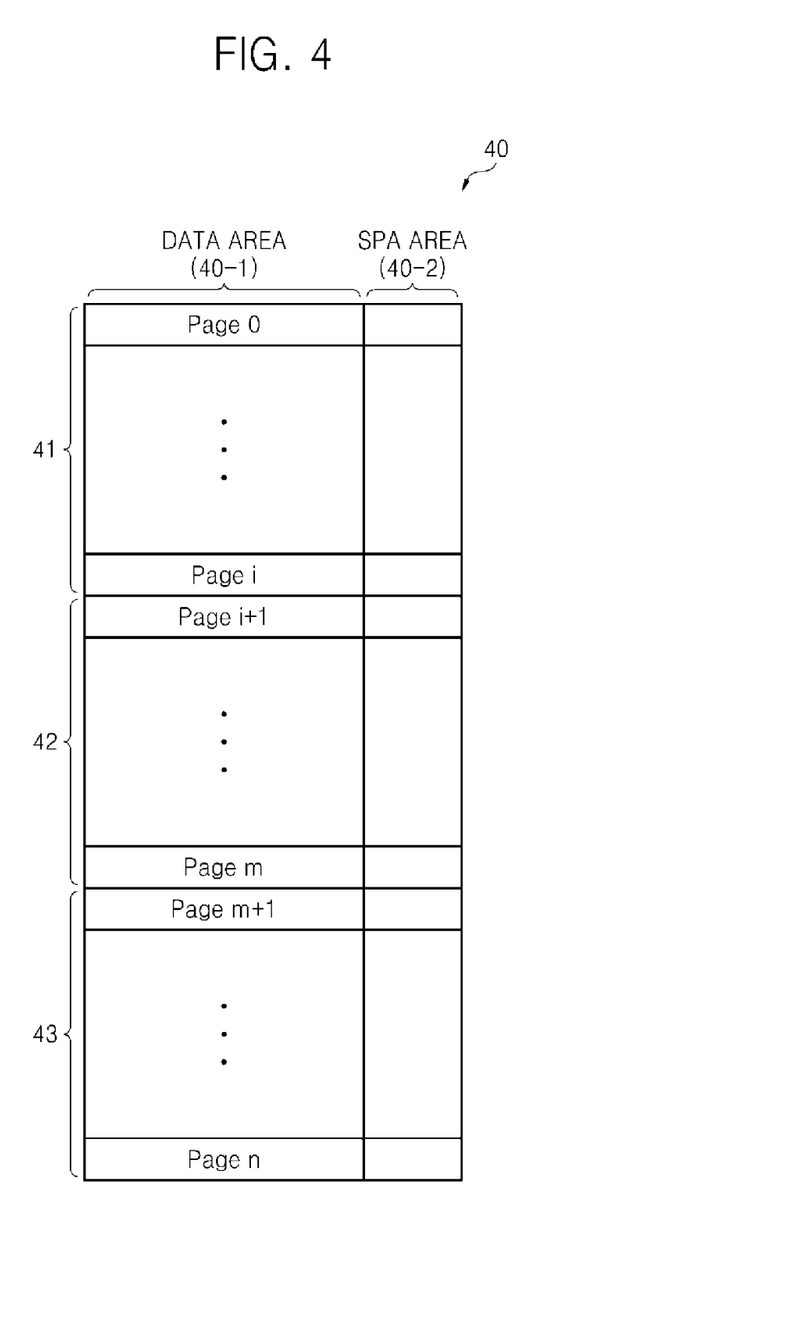
FIG. 4 is a memory map of the memory device illustrated in FIG. 1 according to an embodiment of the inventive concept.

FIG. 4 is a memory map of memory device 40 illustrated in FIG. 1 according to an embodiment of the inventive concept. As illustrated in the memory map, memory device 40 comprises a plurality of memory blocks 41, 42 and 43, and memory blocks 41, 42 and 43 comprise a plurality of pages Page 0 through Page n. Although FIG. 4 illustrates three memory blocks 41, 42 and 43, memory device 40 is not limited to these memory blocks.

Memory blocks 41, 42 and 43 include a data area 40-1 storing write data WDATA output from host 30 and a spare area 40-2 storing first ECC data ECC1 including information related to write data WDATA (or the first ECC data ECC1 and the second ECC data ECC2). In some embodiments, first ECC data ECC1 and second ECC data ECC2 are stored in the same memory block according to addresses ADD output from memory controller 20. For example, first ECC data ECC1 and second ECC data ECC2 can be stored in a first block 41. In other embodiments, first ECC data ECC1 and second ECC data ECC2 are stored different memory blocks according to addresses ADD output from memory controller 20. For example, first ECC data ECC1 can be stored in a first block 41 and second ECC data ECC2 may be stored in a second block 42. Where first ECC data ECC1 and second ECC data ECC2 are stored in the same memory block, first ECC data ECC1 and second ECC data ECC2 can be stored in the same page or different pages according to addresses ADD output from memory controller 20.

Figure 5:
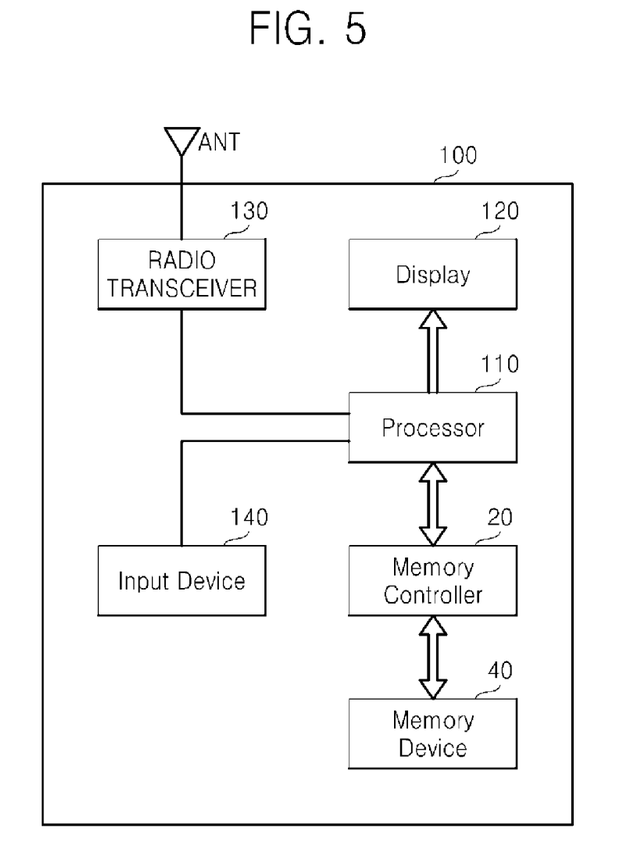
FIG. 5 is a block diagram of an electronic device incorporating a memory system according to an embodiment of the inventive concept.

FIG. 5 is a block diagram illustrating an electronic device 100 incorporating a memory system according to another embodiment of the inventive concept. In this embodiment, electronic device 100 takes the form of a mobile communication device, such as a cellular phone, a smart phone, a personal digital assistant (PDA), or a radio communication device.

Referring to FIG. 5, electronic device 100 comprises memory controller 20, memory device 40, a processor 110, a display 120, a radio transceiver 130, and an input device 140. Memory controller 20 controls data access operation of memory device 40, such as program operations, erase operations, and read operations, under the control of a processor 110. A program-verify operation is typically included as a part of a program operation.

Page data programmed in memory device 40 can be displayed through display 120 under the control of processor 110 and/or memory controller 20.

Radio transceiver 130 transmits and receives radio signals through an antenna ANT. Radio transceiver 130 converts a radio signal received through antenna ANT into a signal to be processed by processor 110, and processor 110 processes the signal output from radio transceiver 130 and transmits a processed signal to memory controller 20 or display 120. Memory controller 20 programs a signal processed by processor 110 in memory device 40. Moreover, radio transceiver 130 converts a signal output from processor 110 into a radio signal and outputs a converted radio signal to an external device through an antenna ANT.

Input device 140 receives a control signal for controlling an operation of processor 110 or data to be processed by processor 110. Input device 140 can take a variety of forms, such as a touch pad, a computer mouse, a keypad, or a keyboard.

Processor 110 controls operations of display 130 so that data output from memory controller 20, data output from radio transceiver 130, and data output from input device 140 is displayed through display 120. In some embodiments, memory controller 20 is implemented as a part of a processor or as a chip separate from a processor.

Figure 6:
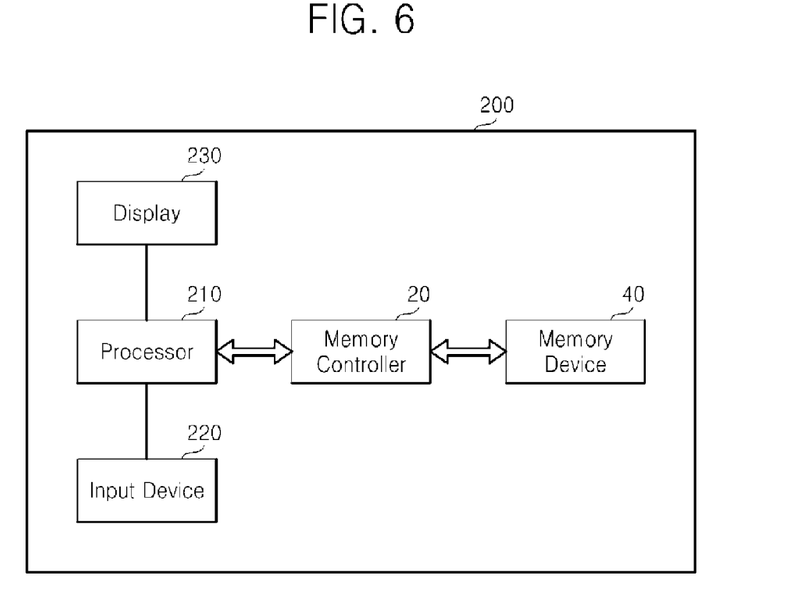
FIG. 6 is a block diagram of an electronic device incorporating a memory system according to another embodiment of the inventive concept.

FIG. 6 is a block diagram illustrating an electronic device 200 incorporating a memory system according to another embodiment of the inventive concept. In this embodiment, electronic device 200 takes the form of an information processing system such as a personal computer (PC), a tablet PC, a net-book, an e-reader, a personal digital assistant (PDA), a portable multimedia player (PMP), a MP3 player, or a MP4 player.

Referring to FIG. 6, electronic device 200 comprises memory controller 20, memory device 40, a processor 210, an input device 220, and a display 230. Processor 210 displays data stored in memory device 40 through display 230 according to data input through input device 220. Input device 220 can take any of various forms, such as a touch pad, a computer mouse, a keypad, or a keyboard.

Processor 210 controls overall operations of memory system 200 and memory controller 20, and memory controller 20 controls operations of memory device 40. In some embodiments, memory controller 20 can be implemented as part of processor 210, or in a chip separate from processor 210.

Figure 7:
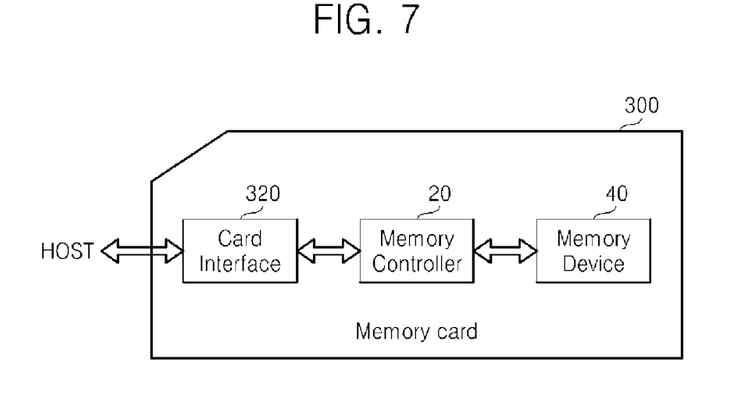
FIG. 7 is a block diagram of an electronic device incorporating a memory system according to still another embodiment of the inventive concept.

FIG. 7 is a block diagram illustrating an electronic device 300 incorporating a memory system according to still another embodiment of the inventive concept. In this embodiment, electronic device 300 takes the form of a memory card or a smart card.

Referring to FIG. 7, electronic device 300 comprises memory controller 20, memory device 40, and a card interface 320. Memory controller 20 controls data exchange between memory device 40 and card interface 320. Card interface 320 can be, for example, a secure digital (SD) card interface or a multi-media card (MMC) interface. However, it is not restricted to these types of interfaces.

Card interface 320 enables data exchange between a host and memory controller 20 according to protocol of a host. Card interface 320 typically implements a standardized protocol, such as USB or interchip (IC)—USB protocol. Card interface 320 can be implemented by hardware supporting a protocol used in a host, software, or some other technique.

Where electronic device 300 is connected to a host such as a PC, a tablet PC, a digital camera, a digital audio player, a cellular phone, console video game hardware or a digital set-top box, the host may perform data communication with memory device 40 through card interface 320 and memory controller 20.

Figure 8:
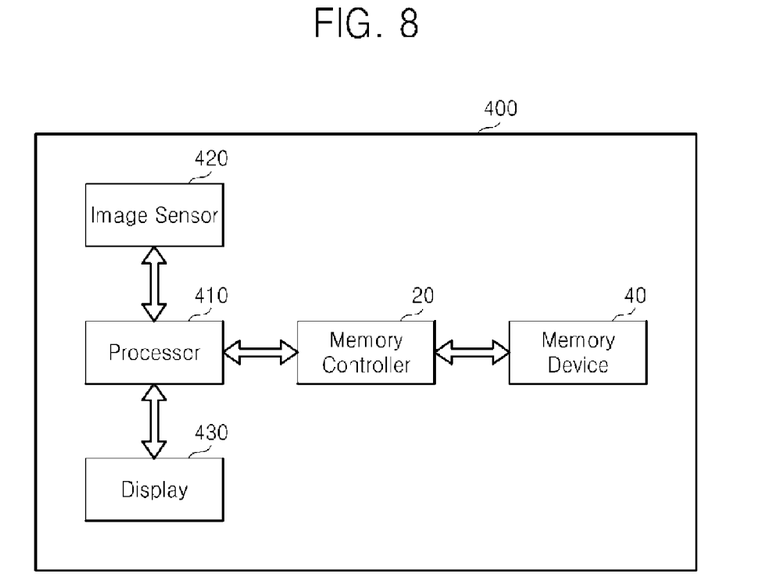
FIG. 8 is a block diagram of an electronic device incorporating a memory system according to still another embodiment of the inventive concept.

FIG. 8 is a block diagram illustrating an electronic device 400 incorporating a memory system according to still another embodiment of the inventive concept. In this embodiment, electronic device 400 takes the form of an image processing device, such as a digital camera or a digital camera-equipped cellular phone.

Referring to FIG. 8, electronic device 400 comprises memory controller 20, memory device 40, a processor 410, an image sensor 420, and a display 430. Image sensor 420 converts an optical image into digital signals, and the converted digital signals are transmitted to processor 410 or memory controller 20. Under the control of processor 410, the converted digital signals are displayed through display 430 or stored in memory device 40 through memory controller 20.

Data stored in memory device 40 is displayed through display 430 under the control of processor 410 and memory controller 20. In various alternative embodiments, memory controller 20 can be incorporated in processor 410 or in a chip separate from processor 410.

Figure 9:
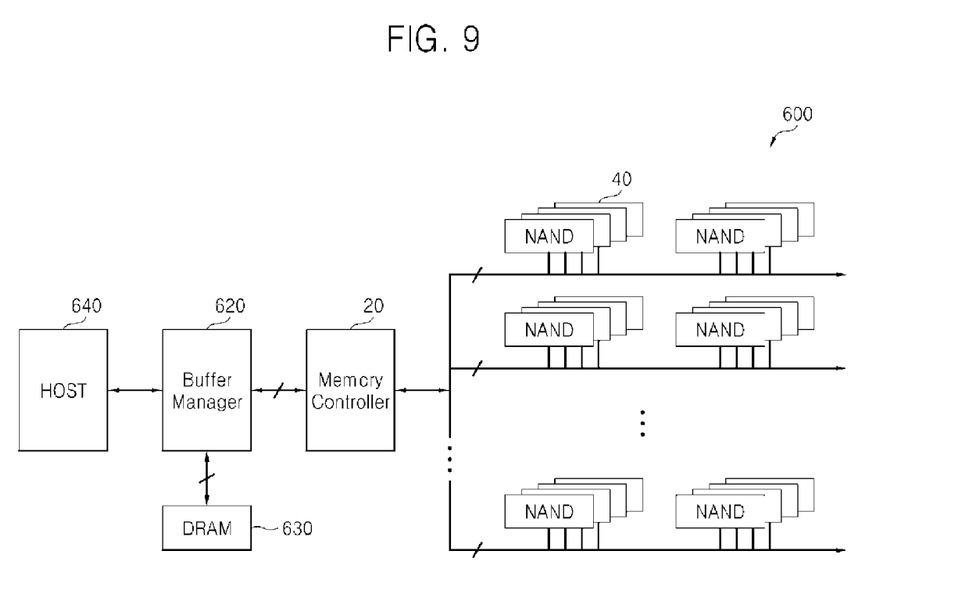
FIG. 9 is a block diagram of an electronic device incorporating a memory system according to still another embodiment of the inventive concept.

FIG. 9 is a block diagram illustrating an electronic device 600 incorporating a memory system according to still another embodiment of the inventive concept. In this embodiment, electronic device 600 takes the form of a data storage device such as a solid state drive (SSD).

Referring to FIG. 9, electronic device 600 comprises memory controller 20, a plurality of memory devices 40, a buffer manager 620, a DRAM 630, and a host 640.

Memory controller 20 controls data processing operations of memory devices 40, volatile DRAM 630, and buffer manager 620. For example, it controls storage of data received from host 640 in volatile memory device 630.

Figure 10:
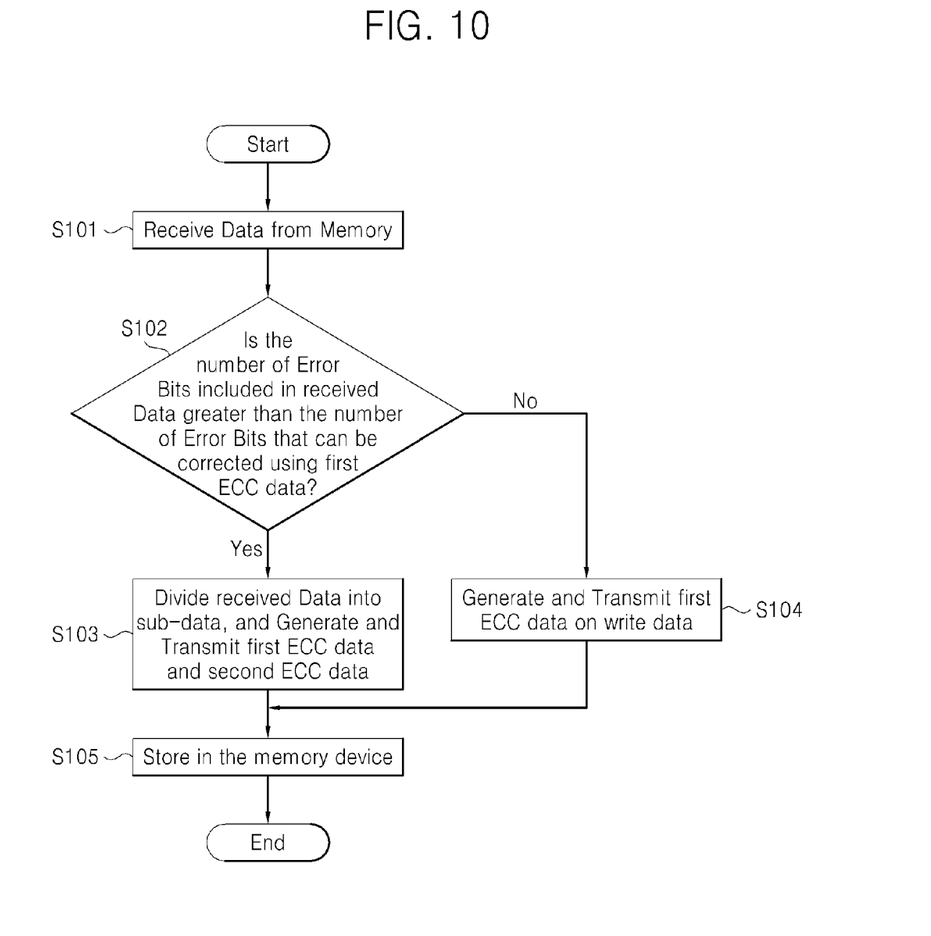
FIG. 10 is a flowchart illustrating an error correction method performed in the memory controller illustrated in FIG. 1 according to an embodiment of the inventive concept.

FIG. 10 is a flowchart illustrating an error correction method according to an embodiment of the inventive concept. For convenience, the method is described with reference to the memory controller of FIG. 1, but it is not restricted to this memory controller.

Referring to FIGS. 1, 2 and 10, memory controller 20 receives read data RDATA and first ECC data ECC1 from memory device 40 in response to a request from host 30 (S101).

Memory controller 20 analyzes read data RDATA and first ECC data ECC1 and determines if the number of error bits included in read data RDATA is greater than the number of error bits that can be corrected using first ECC data ECC1 (S102). If so (S102=Yes), memory controller 20 divides write data WDATA to be written in the memory device 40 into sub-data WDATAa and WDATAb, generates first ECC data ECC1 and second ECC data ECC2 using substantially the same algorithm to correct each error of the divided sub-data WDATAa and WDATAb, and transmits each divided sub-data WDATAa and WDATAb, first ECC data ECC1 and second ECC data ECC2 to memory device 40 (S103).

Memory device 40 stores sub-data WDATAa and WDATAb, first ECC data ECC1 and second ECC data ECC2 in a memory block designated by addresses ADD output from memory controller 20 (S105). The number of bits of each divided sub-data WDATAa and WDATAb becomes equal to the number of bits of the write data WDATA through zero padding. Where the number of error bits included in read data RDATA is equal to or less than the number of error bits that can be corrected by using first ECC data ECC1 according to a determination result (S102=No), memory controller 20 generates only first ECC data ECC1 on write data WDATA and transmits write data WDATA and first ECC data ECC1 to memory device 40 (S104).

Memory device 40 stores write data WDATA and first ECC data ECC1 in a memory block designated by addresses ADD output from memory controller 20 (S105).

Figure 11:
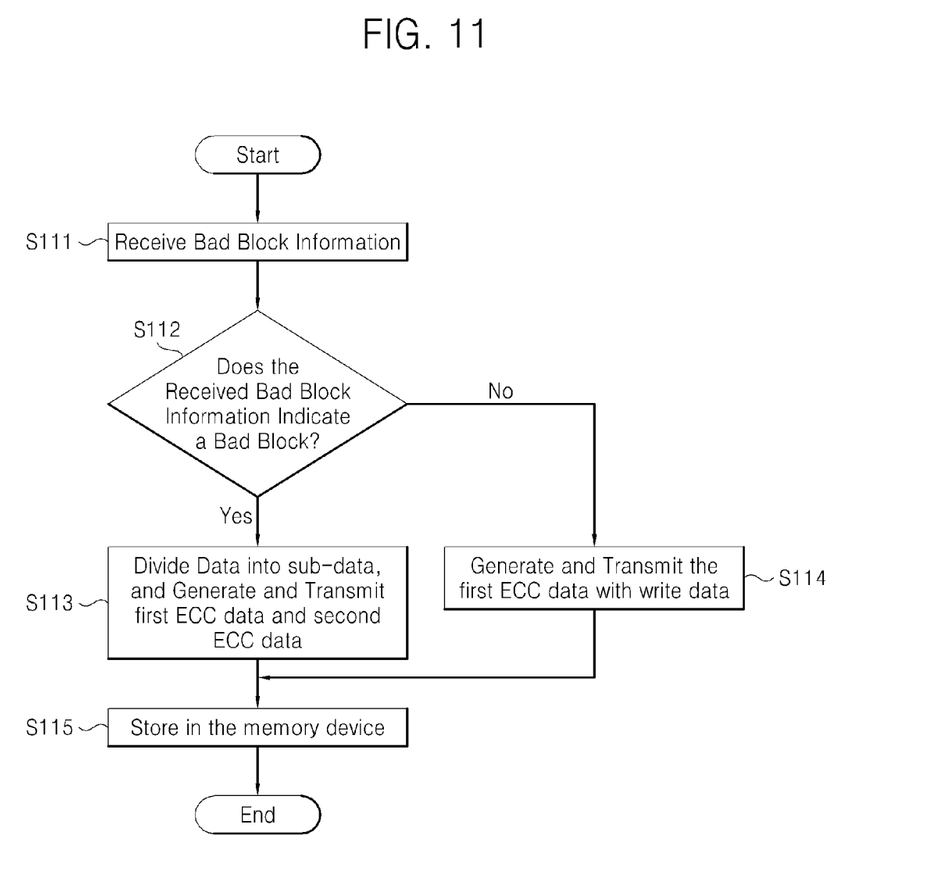
FIG. 11 is a flowchart illustrating an error correction method performed in the memory controller illustrated in FIG. 1 according to another embodiment of the inventive concept.

FIG. 11 is a flowchart illustrating an error correction method according to another embodiment of the inventive concept. For convenience, the method is described with reference to the memory controller of FIG. 1, but it is not restricted to this memory controller.

Referring to FIGS. 1, 2 and 11, memory controller 20 receives bad block information INF for a plurality of memory cells included in memory device 40 (S111). Memory controller 20 then determines whether received bad block information INF indicates a bad block or a good block (S112). Where bad block information INF indicates a bad block (S112=Yes), memory controller 20 divides write data WDATA to be written in memory device 40 into sub-data WDATAa and WDATAb, generates first ECC data ECC1 and second ECC data ECC2 by using the same algorithm to correct each error of sub-data WDATAa and WDATAb, and transmits sub-data WDATAa and WDATAb, and first ECC data ECC1 and second ECC data ECC2 to memory device 40 (S113).

Here, bad block information INF includes the number of program/erase cycles 30-1, program/read count 30-2, ECC error count 30-3, or program/erase failure count 30-4 of memory device 40

Memory device 40 stores each of sub-data WDATAa and WDATAb, and first ECC data ECC1 and second ECC data ECC2 in a memory block designated by addresses ADD output from memory controller 20 (S115). Where bad block information INF indicates a good block (S112=No), memory controller 20 generates first ECC data for write data WDATA and transmits write data WDATA and first ECC data ECC1 to memory device 40 (S114). Memory device 40 stores write data WDATA and first ECC data ECC1 in a memory block designated by addresses output from memory controller 20 (S115).

Figure 12:
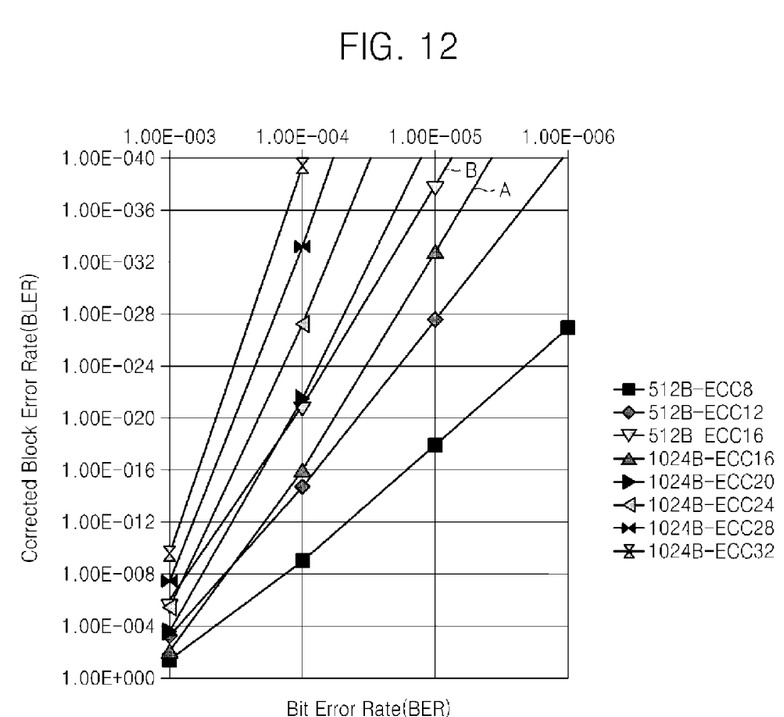
FIG. 12 is a graph illustrating a corrected block error rate as a function of a bit error rate of a multi level cell (MLC) in a memory system according to an embodiment of the inventive concept.

FIG. 12 is a graph illustrating a corrected block error rate as a function of a bit error rate of a multi level cell (MLC) in a memory device according to an embodiment of the inventive concept. The data of FIG. 12 is generated using an error correction method of memory controller 20 as described above. The error correction method uses two ECC algorithms to correct errors in 512 byte data using 16 bytes of data. This can provide superior error correction compared with an ECC algorithm that corrects errors in 1024 byte data using 16 bytes. This improvement is illustrated by a difference between a line A and a line B.

As indicated by the foregoing, a memory controller and a related error correction method can correct errors using a different number of bits according to the number of errors. It can do this by dividing data into sub-data and applying error correction codes to the sub-data using substantially the same algorithm. The described techniques and technologies can improve the reliability of stored data in a relatively efficient way.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims.

What is claimed is:

1. A memory controller, comprising:
 a control unit that analyzes read data received from a memory device and first error correction code (ECC) data of the read data, and generates multiple units of sub-data from write data to be written in the memory device where the number of error bits in the read data is greater than the number of error bits that can be corrected by using the first ECC data, wherein the multiple units of sub-data are generated by dividing the write data into multiple sub-units and padding each of the sub-units of write data with additional bits to produce a corresponding one of the units of sub-data; and an ECC block that generates the first ECC data and second ECC data by using the same algorithm to correct errors in different units of the sub-data, wherein the control unit transmits each of the units of sub-data, the first ECC data and the second ECC data to the memory device.

2. The memory controller of claim 1, wherein the ECC block comprises an encoder that generates the first ECC data for the write data where the number of error bits in the read data is less than or equal to the number of error bits that can be corrected using the first ECC data, and generates the first ECC data and the second ECC data where the number of error bits in the read data is greater than the number of error bits that can be corrected using the first ECC data.

3. The memory controller of claim 1, wherein the control unit generates each unit of the sub-data with the same number of bits as the write data.

4. The memory controller of claim 3, wherein the control unit generates each unit of the sub-data with zero padding.

5. The memory controller of claim 1, wherein the control unit further outputs addresses such that the first ECC data and the second ECC data are stored in the same memory block of the memory device.

6. The memory controller of claim 5, wherein the control unit further outputs addresses such that the first ECC data and the second ECC data are stored in different pages of the same memory block of the memory device.

7. The memory controller of claim 1, wherein the control unit further outputs addresses such that the first ECC data and the second ECC data are stored in different memory blocks of the memory device.

8. The memory controller of claim 1, wherein the memory device is a flash memory device.

9. A memory controller comprising:
a control unit that receives bad block information for a plurality of memory cells included in a memory device and generates multiple units of sub-data from write data to be written in the memory device where the received bad block information indicates a bad block, wherein the multiple units of sub-data are generated by dividing the write data into multiple sub-units and padding each of the sub-units of write data with additional bits to produce a corresponding one of the units of sub-data; and
an error correction code (ECC) block generating first ECC data and second ECC data by using the same algorithm to correct errors in each unit of sub-data, wherein the control unit transmits each of the units of sub-data, the first ECC data and the second ECC data to the memory device.

10. The memory controller of claim 9, wherein the bad block information indicates a number of program/erase cycles, a program/read count, an ECC error count, or a program/erase failure count of the memory device.

11. The memory controller of claim 9, wherein the control unit further outputs addresses such that the first ECC data and the second ECC data are stored in different memory blocks of the memory device.

12. The memory controller of claim 9, wherein the control unit further outputs addresses to store the bad block information in an additional nonvolatile memory device.

13. The memory controller of claim 9, wherein the control unit generates each unit of the sub-data with the same number of bits as the write data.

14. The memory controller of claim 13, wherein the control unit generates each unit of the sub-data with zero padding.

15. An error correction method, comprising:
receiving information indicating a number of errors in data stored in a memory device;
determining whether the number of errors is greater than a number of errors that can be corrected using a first error correction code (ECC); and
upon determining that the number of errors in the data is greater than the number of errors that can be corrected by the first ECC, generating multiple units of sub-data from write data to be written in the memory device, and generating the first ECC and a second ECC by using the same algorithm to correct errors in different units of the sub-data, and transmitting the sub-data, the first ECC data and the second ECC data to the memory device, wherein the multiple units of sub-data are generated by dividing the write data into multiple sub-units and padding each of the sub-units of write data with additional bits to produce a corresponding one of the units of sub-data.

16. The error correction method of claim 15, wherein the received information is bad block information stored in a table of bad block information.

17. The error correction method of claim 15, wherein the received information is generated by an ECC block by analyzing the data stored in the memory device.

18. The error correction method of claim 15, wherein the memory device is a flash memory device.

19. The error correction method of claim 15, further comprising:
padding each unit of the sub-data with zeros so that it has the same number of bits as the write data.

20. The error correction method of claim 15, wherein the multiple units of sub-data are stored in the same memory block of the memory device.

* * * * *